(12) United States Patent
Jorguseski et al.

(10) Patent No.: US 8,849,346 B2
(45) Date of Patent: Sep. 30, 2014

(54) METHOD AND TELECOMMUNICATIONS NETWORK FOR DEACTIVATING OR ACTIVATING A CELL IN SUCH A NETWORK

(75) Inventors: Ljupco Jorguseski, The Hague (NL); Remco Litjens, Voorschoten (NL); Haibin Zhang, The Hague (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 13/696,270

(22) PCT Filed: May 4, 2011

(86) PCT No.: PCT/EP2011/057084
§ 371 (c)(1),
(2), (4) Date: Nov. 5, 2012

(87) PCT Pub. No.: WO2011/138346
PCT Pub. Date: Nov. 10, 2011

(65) Prior Publication Data
US 2013/0053039 A1    Feb. 28, 2013

(30) Foreign Application Priority Data

May 6, 2010  (EP) .................................... 10162161
Nov. 15, 2010 (EP) .................................... 10191190

(51) Int. Cl.
*H04W 88/02* (2009.01)
(Continued)

(52) U.S. Cl.
CPC .............. *H04W 24/02* (2013.01); *H04W 36/22* (2013.01); *H04W 24/10* (2013.01); *H04W 88/06* (2013.01)
USPC ....................................... 455/553.1; 455/436

(58) Field of Classification Search
USPC ................... 455/553.1, 436, 442, 525, 556.1; 370/252, 241.2, 278, 312, 331, 311, 370/332
See application file for complete search history.

(56) References Cited

U.S. PATENT DOCUMENTS

| | | | |
|---|---|---|---|
| 2011/0171915 A1* | 7/2011 | Gomes et al. | .................... 455/73 |
| 2011/0201279 A1* | 8/2011 | Suzuki et al. | .............. 455/67.11 |
| 2012/0108199 A1* | 5/2012 | Wang et al. | .................... 455/405 |

FOREIGN PATENT DOCUMENTS

EP    2056628 A1    5/2009

(Continued)

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)", 3GPP TS 37.320, V10. 0.0, Dec. 2010, pp. 1-17.

(Continued)

*Primary Examiner* — Diane Mizrahi
(74) *Attorney, Agent, or Firm* — McDonnell Boehnen Hulbert & Berghoff LLP (57) ABSTRACT

The invention relates to a method for deactivation of at least one first cell of a plurality of cells in a telecommunications network. User devices in the at least one first cell are triggered to report measurement information regarding one or more second cells of the plurality of cells to the telecommunications network. The measurement information is received in the telecommunications network and analyzed, in order to determine whether one or more user devices in the at least one first cell are eligible for being served by a second cell of the one or more second cells when the at least one first cell would be deactivated. When the one or more user devices are determined to be eligible for being served by the second cell of the one or more second cells, the one or more user devices are transferred and the at least one first cell is deactivated.

14 Claims, 8 Drawing Sheets

(51) Int. Cl.
*H04W 24/02* (2009.01)
*H04W 36/22* (2009.01)
*H04W 24/10* (2009.01)
*H04W 88/06* (2009.01)

(56) References Cited

FOREIGN PATENT DOCUMENTS

| | | | |
|---|---|---|---|
| EP | 2114093 | A1 | 11/2009 |
| EP | 2141947 | A1 | 1/2010 |
| WO | WO2008/044208 | A2 | 4/2008 |
| WO | WO2009/119699 | A2 | 10/2009 |

OTHER PUBLICATIONS

"3rd Generation Partnership Project; Technical Specification Group Radio Access Network; Evolved Universal Terrestrial Radio Access Network (E-UTRAN); Self-Configuring and Self-Optimizing Network (SON) Use Cases and Solutions (Release 9)", 3GPP TR 36.902 V9.1.0 (Mar. 2010), pp. 1-23.

Ericsson, "Sustainable Energy for Mobile Communications", White Paper, Jun. 2007, pp. 23.

PCT International Search Report, PCT International Application No. PCT/EP2011/057084 dated Sep. 23, 2011.

* cited by examiner

METHOD AND TELECOMMUNICATIONS NETWORK FOR DEACTIVATING OR ACTIVATING A CELL IN SUCH A NETWORK

CROSS REFERENCE TO RELATED APPLICATIONS

The present application is a national stage entry of PCT/EP2011/057084, filed May 4, 2011, and claims priority to EP 10162161.3, filed May 6, 2010 and EP 10191190.7, filed Nov. 15, 2010. The full disclosures of EP 10162161.3, EP 10191190.7, and PCT/EP2011/057084 are incorporated herein by reference.

FIELD OF THE INVENTION

The invention relates to the field of telecommunications infrastructures. More specifically, the invention relates to the fields of controlling energy consumption, particularly reducing energy consumption, or electromagnetic radiation, in telecommunications infrastructures comprising wireless access networks.

BACKGROUND OF THE INVENTION

The operation of wireless access networks for enabling wireless communication is highly energy consuming. In view of current environmental concerns, increased attention is paid recently to the energy consumption of telecommunications networks.

Various studies have been performed to reduce conventional energy consumption in wireless access networks, e.g. by exploring the option of using sustainable energy sources (Ericsson AB White Paper "Sustainable energy use in mobile communications", June 2007).

With the development of the 3GGP Long Term Evolution (LTE) network, energy saving for the network is also approached in the context of self organizing networks (SONs). In a White Paper of NEC, dated February 2009, "NEC's proposals for next-generation radio network management", energy is considered as a significant part of the operation expenses of a cellular network. It is recognized that the main saving potential resides in using variations in load over time, that allows to switch off parts of the resources, for example during the night. When a complete base station is switched off, other base stations of the access network need to compensate for the reduction in coverage area and capacity. This requires coordination between the nodes. A similar use case is described in 3GGP TR 36.902 v9.1.0 "Self-configuring and self-optimizing network (SON) use cases and solutions".

The activation and deactivation of base stations, or cells thereof, or reduction of its operability has implications for user devices (terminals, user equipment (UE)) in the coverage area of these base stations or cells.

The current estimation when to switch off/on a base station (or cell) and which base stations to switch off/on is usually based on load and configuration information that might be complemented with handover (HO) statistics. Load measurements can e.g. be performed for one or more cells in the network of a network operator. The network operator also has detailed information on the configuration of e.g. the base station antenna directions and tilting, base stations transmit powers, etc. that can be used, with support of propagation models in order to estimate the best server areas per cell. Additionally, from network HO counters, the network operator can make HO statistics for the cells. In this way by combining configuration settings, propagation/planning data and HO statistics the network operator can estimate when a particular cell (or base station) can be switched off/on and which remaining cells may provide compensating coverage in the areas of the cells that have been switched off.

The current estimation techniques provide several disadvantages. The estimations are based on models for the antenna patterns and propagation conditions. These models have intrinsic inaccuracy when compared to the real-life situation due to modelling errors and simplifications. Additionally, any change in the antenna configuration, propagation environment, etc. has to be accurately and timely updated in order to maintain some accuracy of the estimation. This can be a rather demanding task, especially in case of self-optimizing radio access networks that dynamically reconfigure antenna set-up (e.g. tilting or azimuth), downlink transmission powers, etc.

Furthermore, the planning tool for estimation has to be run in parallel with the changes of the antenna configuration settings, downlink power settings, etc. in order to obtain up-to-date estimation. Running coverage/planning predictions is usually only executed off-line at network roll-out and network extensions. Running such predictions in parallel with the network operations and entirely consistent with any change to the network's configuration is a cumbersome task.

Still further, the estimation via planning/propagation tools and configuration data is usually based on some kind of 'average user' assumptions or predictions for the spatial distribution of the user devices and/or the traffic related to the devices. This is another source of intrinsic error due to the uncertainty of the predictions. Even though these spatial traffic/device distributions might realistically reflect the average traffic/device spatial distributions, the actual distributions might strongly deviate from the 'average' situation at the moment when a cell has to be switched off or on.

There exists a need in the art for improved control on the effect of the activation/deactivation of base stations, or cells thereof, on the user devices associated with these base stations.

SUMMARY OF THE INVENTION

A method for deactivation of at least one first cell of a plurality of cells in a telecommunications network is disclosed. The plurality of cells of the telecommunications network define a coverage area containing a plurality of user devices.

User devices in the at least one first cell are triggered to report measurement information regarding one or more second cells of the plurality of cells to the telecommunications network. The measurement information is received in the telecommunications network (preferably using the still active at least one first cell) and analysed (in the telecommunications network or by an external system), in order to determine whether one or more user devices in the at least one first cell are eligible for being served by a second cell of the one or more second cells when the at least one first cell would be deactivated.

When the one or more user devices are determined to be eligible for being served by the second cell of the one or more second cells, the one or more user devices are transferred, i.e. are handed over or perform cell reselection, from the first cell to the second cell and the at least one first cell is deactivated.

It should be noted that in an embodiment of the invention, handover is performed prior to deactivating the at least one first cell. Cell reselection may take place either before, at or after deactivating the at least one first cell.

A telecommunications network wherein this method can be performed is also disclosed.

A computer program containing software code portions, possibly run on different systems, for performing the method is also disclosed.

A user device, particular a user device in an idle state, configured for participating in the method and telecommunications network is also disclosed.

By instructing a substantial fraction (possibly all) user devices in the first cell to report measurement information regarding one or more second cells observed by the user devices and analysing the received measurement information, an almost real-time assessment of opportunities to deactivate a particular cell or base station is obtained. By deactivating the particular cell or base station, energy consumed by and/or electromagnetic radiation radiated by the telecommunications network may be reduced.

It should be noted that in the present disclosure a cell is considered 'active' when the cell is configured to provide to a user device substantially all services it usually provides during normal operation. For example a user device can connect to the base station responsible for defining the cell and the base station supports the traffic flow for voice and/or data services. A cell is considered 'inactive' or 'deactivated' when the cell is configured to provide to a user device no service or to provide only a limited set of services compared to what it usually provides during normal operation. For example the base station does not support new connection requests, the base station does not support a traffic flow for voice and/or data services, the base station supports only a limited set of radio resources or of mobility management messages and/or a user device cannot connect to that base station. Note that an inactive cell is not necessarily free from any signal from the base station. Signals such as broadcast signals or pilot signals may still be present and some information may be exchanged between such a cell and a user device. Of course, a cell is considered inactive when no signals are transmitted in this cell from the base station previously responsible for this cell.

Further embodiments of the invention are defined in the dependent claims.

An alternative method for analysing whether or not to deactivate a cell includes a method in a telecommunications network containing a plurality of cells defining a coverage area containing a plurality of user devices. The plurality of cells are in a current state wherein a first cell is an active cell and a second cell is an active cell.

History information is retrieved about a previous transition from a first previous state wherein the first cell was an active cell and the second cell was an active cell to a second previous state wherein the first cell was an inactive cell and the second state was an active cell. As an example, if it is considered to deactivate the first cell at a particular time of day/week, information is retrieved about the effect of switching off the first cell in the past at that particular moment. The information could e.g. relate to the number of handovers from the first active cell to the second cell. It may then be estimated from the retrieved history information whether the first cell may be deactivated. The first cell is deactivated based on the estimation that user devices may be transferred to the active second cell.

Another aspect of the present disclosure includes a method for activating a cell in a telecommunications network A method in a telecommunications network containing a plurality of cells defining a coverage area containing a plurality of user devices is disclosed. The plurality of cells comprise a first cell as an active cell for a first radio access technology and a second cell as an inactive cell for the first radio access technology and an active cell for a second radio access technology. Examples of radio access technologies, also abbreviated as RATs, include GSM, UMTS and LTE.

User devices in the at least one first cell are triggered to report measurement information regarding the second radio access technology of the second cell. The measurement information regarding the second radio access technology of the second cell is received in the telecommunications network (e.g. via the first cell using the first RAT or via the second cell using the second RAT) to determine whether one or more user devices in the at least one first cell are eligible for being served by the second cell using the first radio access technology.

The first radio access technology is activated in the second cell when the one or more user devices are determined to be eligible for being served by the second cell using the first radio access technology.

In order to improve the accuracy of estimations for the first RAT in the second cell based on measurement information for the second RAT in the second cell, the second cell for the first RAT and second RAT are co-sited.

It should be noted that, separate from or in addition to considerations of energy conservation, similar considerations apply to the reduction of electromagnetic radiation produced by a base station. For example, for health reasons it is advisable to limit the amount of electromagnetic radiation to a level that is strictly necessary for the operation of the base station. When the level of electromagnetic radiation can be reduced or when a base station can be switched off, this may be well-appreciated by the population in the vicinity of the base station. In addition to health concerns, there may also be technical reasons to restrict the electromagnetic radiation, and therewith the possibility and level of interference experienced in adjacent areas.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1A:
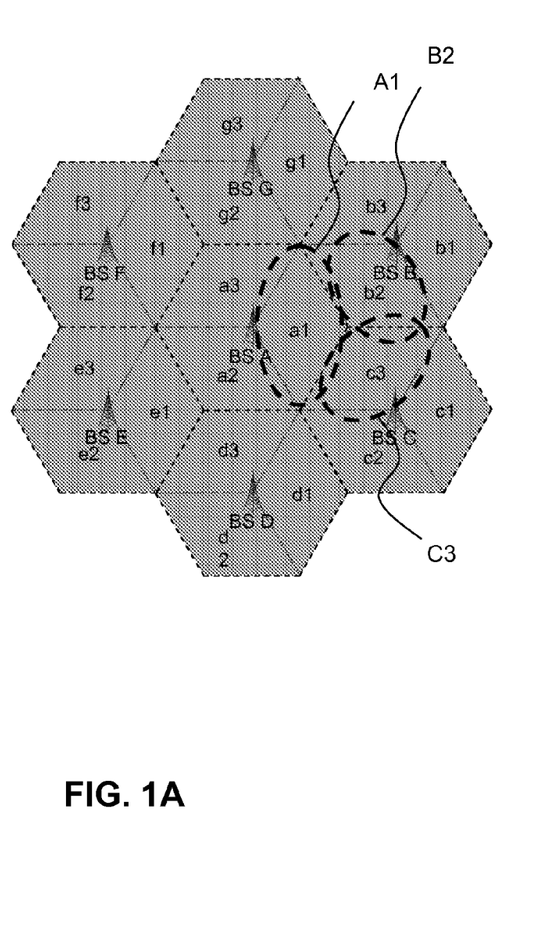
FIGS. 1A and 1B are schematic illustrations of base stations providing active cells and inactive cells.

FIG. 1A is a schematic illustration of base stations BS A-BS G providing a plurality of active cells. Each base station location comprises three sectors, thus covering an area around the base station location. For example, cell A1 of base station location BS A serves its best server area marked 'a1'. Similarly, cells A2 and A3 (not shown) of the same base station location BS A serve their best server area marked 'a2' and 'a3' respectively. A same set-up is shown for the other base station locations BS B to BS G. In FIG. 1A, the regular pattern of base stations and sectors leads to the commonly known hexagonal of coverage areas.

At some point in time, cell A1 of base station BS A may experience a low load of active user devices. In such a situation, it may be profitable for energy consumption reduction or other reasons to deactivate, e.g. to completely switch off, cell A1 or even all cells A1-A3 at this base station (illustrated by the white server area a1 in FIG. 1B). Direct deactivation of one or more cells at the base station BS A may affect user devices served by this cell. The effect of switching off one or more cells on these user devices should be taken into account. In particular, it should be analysed if it is feasible to transfer the current (and in the near future anticipated) traffic from the cell of base station BS A to neighbour cells B2 and C3 and, if so, to which neighbour. Preferably, it should be verified that for (substantially) all user devices currently served by the cell A1 of base station location BS A there is indeed an alternative. Furthermore, it may be verified whether a reasonable quality of service (QoS) can still be obtained for the user devices taken over by other cells and, similarly, whether a reasonable QoS can still be maintained for the user devices already being served by one of the other cells. The measure of deactivating cell A1 to reduce energy consumption is weighed against the implications for the user devices for which there is no alternative and furthermore for the QoS likely to be experienced by the user devices involved. In other words, a base station deactivation algorithm is used for analysing whether traffic can be transferred from the cell A1 of base station BS A to cells B2 and C3 of base stations BS B and BS C, respectively, and whether acceptable QoS levels can be maintained to decide whether or not to deactivate cell A1 of base station A.

Figure 2A:
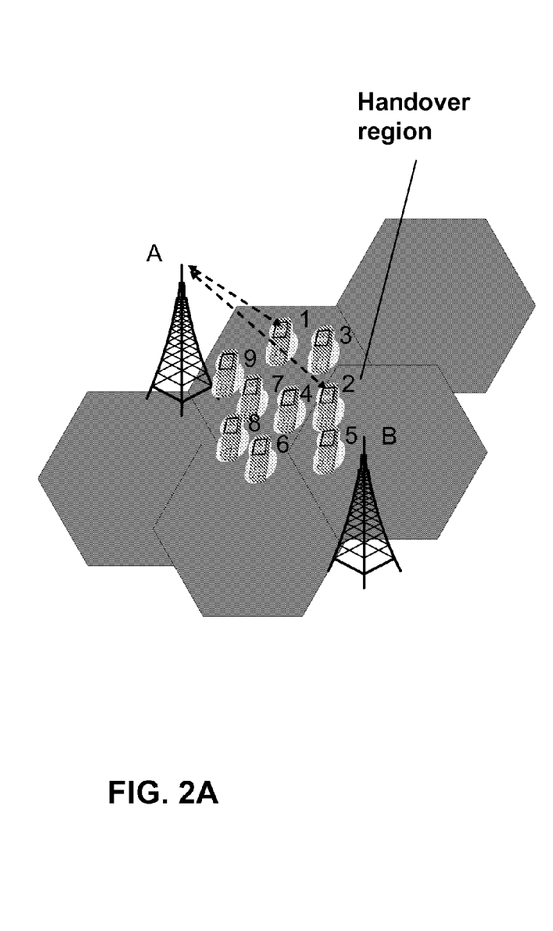
FIGS. 2A and 2B are schematic illustrations of a first and a second base station defining a cell containing a plurality of user devices to be transferred to neighbouring cells of another base station.
Figure 2B:
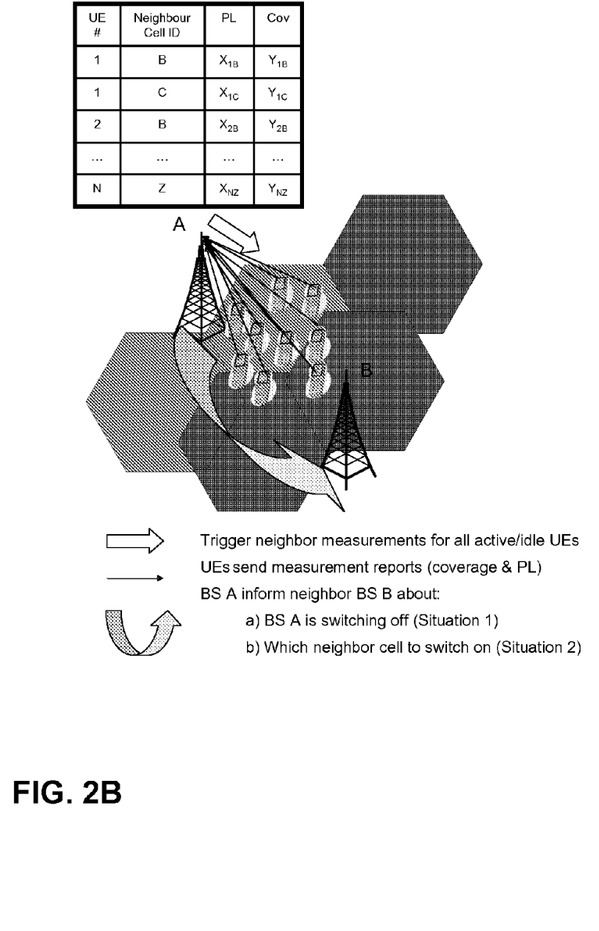

Referring now to FIGS. 2A and 2B, a situation is depicted wherein a cell of base station A is considered as a candidate to be switched off, for example, because at that moment the number of active user devices served by the cell in base station A is rather low. For example, as presented in FIG. 2A, there are two active user devices 1 and 2 (i.e. devices that have a signalling/traffic connection with the base station A).

The number of idle user devices 3 to 9 (i.e. user devices that do not have a signalling/traffic connection with the base station A but only camp on this base station A) is much larger.

Apart from the distinction between idle and active user devices, a further distinction between the user devices 1-9 can be observed.

Active user device 2 is in a handover region and performs signal measurements to prepare for handover to the cell of base station B. In this situation, user device 2 reports measurements about the cell of base station B and possibly about other cells to the telecommunications network if certain conditions are met (e.g. if the level of the pilot signal received from base station A is below a threshold). Different from active user device 2, active user device 1 is not in a handover region and does not measure and report signals from other cells (e.g. because the pilot signal level received from base station A is above a threshold). It should be noted that measurements made by a user device about base station B may involve the same radio access technology or a different radio access technology than the radio access technology (RAT) of base station A.

A further distinction is also applicable to the idle user devices 3-9 in FIG. 2A. The idle user devices may also measure neighbour cells, such as the cell(s) of base station B. Idle user devices 5, 6 and 8 verify whether they should camp on a cell of base station B instead of the cell of base station A. Idle devices 3, 4, 7 and 9 do not perform such a verification. Again, the same or different RATs may apply for base stations A and B.

In order to assess whether the cell of base station A can be deactivated, it may be advantageous to instruct all, or a substantive number of, user devices 1-9 to report measurement information about neighbour cells. In particular, active user devices not finding themselves in the handover region and idle user devices should be instructed to measure and report information received about neighbour cells (e.g. pilot level strength, estimated path loss, etc. together with the cell ID) as these user devices do not measure and report on their own account and, in addition, are more likely to be affected severely if base station A is deactivated.

Figure 4:
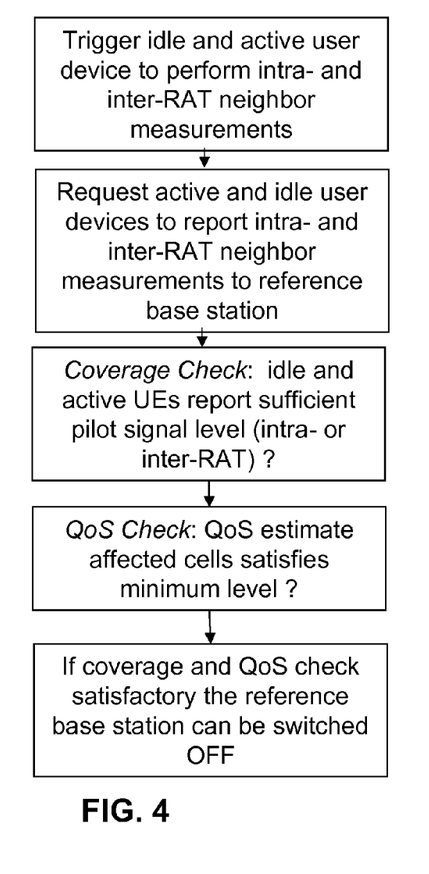
FIG. 4 is a flow chart for deciding deactivation of a cell of a telecommunications network according to an embodiment of the invention.

Referring now particularly to FIGS. 2B and 4, an embodiment of the invention operates as follows.

As a first step, base station A triggers active and idle user devices 1-9 in cell A to perform measurements on one or more neighbouring cells. Various methods to trigger the user devices will be discussed below.

In a second step, the user devices 1-9 report the measurement information, e.g. to base station A.

The measurement information (possibly aggregated per user device) can be represented as a table as shown in FIG. 2B. An estimate of the contribution of the cell to the coverage of the user device by this cell and QoS achievable for the user device can be made. Neighbouring cells can be ranked and a selection is made for the highest ranked neighbour cells.

After collecting the neighbour pilot signal level measurements from all (active and idle) user devices 1-9, it may be determined or estimated how many user devices do not have any (intra- or inter-RAT) neighbour with a pilot signal level that satisfies a (RAT-specific) minimum threshold (e.g. for coverage). The coverage verification may e.g. be considered passed if the number or the fraction of the user devices currently in the cell of base station A which indicate that not at least one sufficient alternative pilot signal level is found, is lower than an operator-defined threshold (e.g. less than three devices or lower than 1%, etc.).

Similarly, after collecting the estimated path loss measurements (or after determining values of path loss from the collected pilot level measurements and related neighbour cell information), preferably for those neighbours that satisfy the minimum threshold on measured pilot signal level, from all active user devices, it may be determined or estimated which QoS is achievable for each of the active user devices 1, 2 when these would be served by a particular neighbour. For this purpose the telecommunications network can also use load information signalled from the (intra- or inter-RAT) neighbours of interest and the current resource usage/availability in those neighbours. The QoS verification may e.g. be considered passed when the estimated resulting QoS level satisfies an operator-defined minimum QoS level.

As a next and final step, when the processing is finalized, a decision is taken whether to switch off one or more cells of base station A. The decision may also take account of an energy consumption reduction analysis result obtained from running an energy consumption reduction analysis algorithm. If the result meets an energy condition, indicating significant energy savings from deactivating one or more cells of base station A, the one or more cells of base station A can actually be deactivated. The decision may also be indicated towards neighbour base station B. Base station B may possibly adapt its configuration prior to deactivating a cell of base station A in order to prepare for the expected additional traffic and/or extension of the area to serve.

Instead of or in addition to energy conservation considerations, also the possibilities to reduce electromagnetic radiation could be taken into account. In particular of electromagnetic radiation reduction, different weights could be associated with different areas, for example depending on (expected) population density.

As mentioned above, several methods have been envisaged to instruct user devices to perform measurements and/or to report the measurement information.

Figure 3:
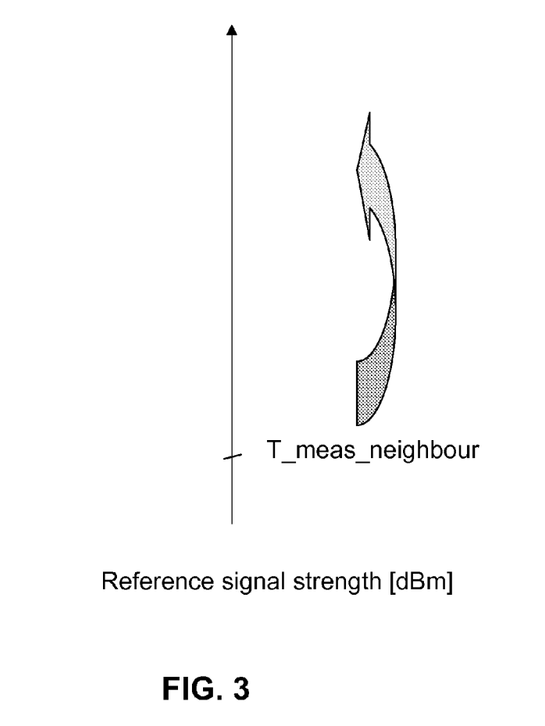
FIG. 3 is a schematic illustration of signal level and signal level threshold depicting a mechanism for controlling from the network whether user devices perform measurements according to an embodiment of the invention.

As schematically illustrated in FIG. 3, a threshold pilot signal level T_meas_neighbour may apply within the cells of base station A. The value of this threshold is generally broadcast in a cell as system information. If a user device 1-9 in cell A measures cell A's pilot signal level to be below that threshold, the user device starts measuring neighbour cells, e.g. one or more cells of base station B. In order to instruct all (active or idle) user devices in cell A to measure neighbour cells, the network can adjust, temporarily, the corresponding threshold T_meas_neighbour in cell A to a rather high signal strength value, so that substantially all user devices in cell A (even the user devices that are not preparing for handover or are not considering cell reselection, i.e. user devices outside the handover region and close to base station A) will measure neighbour signal strengths.

In principle, the threshold may be set to different values for idle user devices and for active user devices. Similarly, different values may also be used for measuring intra-RAT or inter-RAT neighbours. For reasons of clarity, FIG. 3 only illustrates a single threshold T_meas_neighbor.

After having performed measurements on neighbour cells, the user devices should report the measurement information to the telecommunications network, e.g. to base station A.

Active user device 2, which is in the handover region and is preparing for handover, reports neighbour signal strengths already (controlled and formatted by the network) in order for the network to initiate the handover towards the desired target cell. Active user device 1, which is not in the handover region and does not prepare for handover (but may have been triggered to perform neighbour measurements, e.g. by explicit signalling or by temporarily adjusting the threshold T_meas_neighbour as described above) can be explicitly signalled (as there is a signalling connection between active user device 1 and the network via cell A) to report the neighbour measurements. Alternatively, the network can adjust a reporting threshold for the active user device (using e.g. the system information provided via the broadcast channel) such that more active user devices will report neighbour measurements.

Whereas the manipulation of the threshold pilot signal level T_meas_neighbour is applicable for all user devices 1 in the cell, it should be appreciated that individual active user devices can also be instructed to perform measurements via the existing connection with the network. Of course, reporting of the measurement information may take place via the existing connection as well.

It should further be noted that for some RATs, such as UMTS, active user devices 1 always collect measurement information on neighbours on the same frequency. In such cases, the reporting conditions for delivering the measurement information to the network may be manipulated.

Next, exemplary methods will be discussed for instructing idle user devices 3-9 to perform and report measurements on neighbour cells and to report this information to the telecommunications network.

Figure 5:
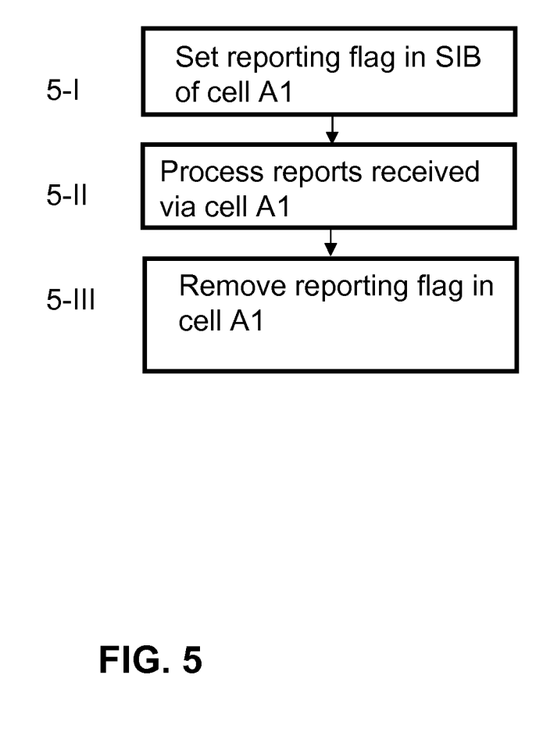
FIGS. 5-7 are flow charts illustrating steps of a method for participation of idle user devices.

In a first method, illustrated in the flow chart of FIG. 5, a reporting identifier, also referred to as reporting flag, is broadcast in the cell A1 of FIG. 1A.

In step 5-I, the system information (SIB) to be broadcast on the broadcast channel of cell A1 comprises a reporting flag. In cell A1, a paging message may be issued indicating modified system information. This paging message is also received by idle user devices camping on the active cell A1.

An idle user device T, detecting the reporting flag, is configured (see FIG. 8) to report information about its identity (e.g. IMSI) and about n best cells observed by the user device, possibly including signal strength, signal quality, path loss estimate, etc. for these best cells. In doing so, the user device in detecting the reporting flag may adjust temporarily a signal level/quality measurement threshold to enable the measurements. The report is sent once on first detection of the reporting flag being set.

In step 5-II, the reports of idle user devices are received in the telecommunications network via cell A1 and processed in a processing system of the telecommunications network. The reporting flag set in cell A1 is a signal for the idle user device T to assemble and transmit the report via same cell A1.

After sufficient information has been obtained in step 5-III in the cell A1, the system information (SIBs) may be reverted to normal operating conditions (which also includes removal of the reporting flag). A paging message may again be issued indicating modified system information.

Figure 6:
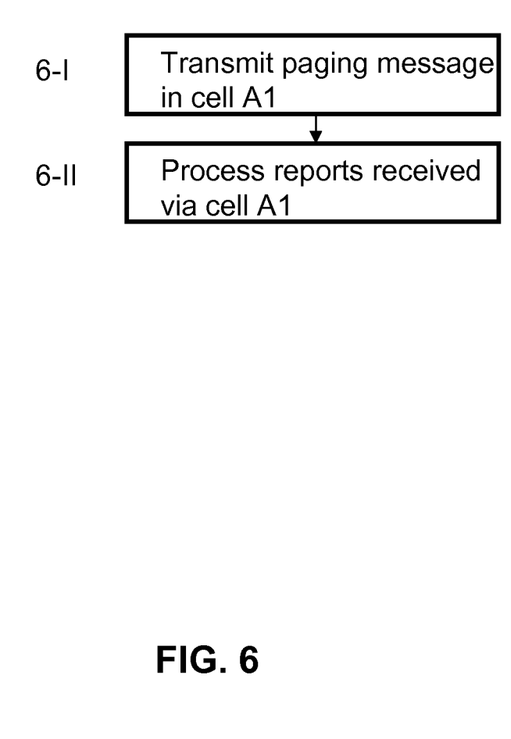

In a second method, illustrated in the flow chart of FIG. 6 as step 6-I, a measurement-and-report paging message, hereinafter denoted as paging message, is transmitted in the cell A1 instructing the idle user devices T to obtain and report information about the neighbour cells. The user device is configured, in response to receiving the paging message of step 6-I, to report information about the identity of the user device (e.g. IMSI) and about n best cells observed by the user device, possibly including signal strength, signal quality, oath loss estimate etc. for these best cells. The report is sent once after receipt of the paging message.

The paging message may optionally comprise configuration parameters for the idle user device T. Examples are parameters that further specify the measurements to be made (which terminals should measure, which cell(s) to be measured, which RAT to be measured, which characteristics, etc.) and parameters that further specify the report to be provided (how many of the best cells to be reported, which quantities—e.g. signal level/quality, path loss estimates—to be reported, destination of the report, etc.). The paging parameters may alternatively or in addition, include a reference where the (further) parameters may be obtained, e.g. a reference (link) to a broadcast channel or the like, for example when the set of parameters is impractically large to be sent in the paging message itself.

A user device T receiving configuration parameter values in (or associated with) the paging message applies the received values when performing the measurements and the reporting as commanded by the paging message. For parameters not included in the paging message, default values may apply, e.g. preconfigured in the user device or received as system information. It may be that, in case of a conflict with an existing parameter having been assigned a value, the value received in the paging message is only applied for the measurements and report(s) related to the present method. Other procedures continue to apply the already assigned value and are not affected by the value in the paging message.

In step 6-II, the reports of idle user devices T are received in the telecommunications network via cell A1 (by default, as being the originator of the paging message) (or via different cell(s) when the paging message instructed the user devices to do so) and processed in a processing system of the telecommunications network.

Figure 7:
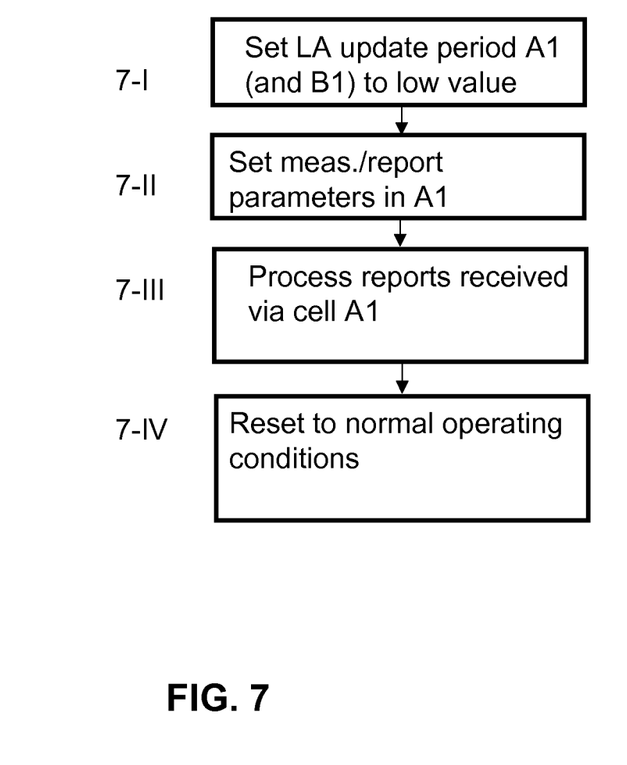

In a third method, illustrated in the flow chart of FIG. 7, a location area (LA) update period (or a similar period) is decreased in at least cell A1. The embodiment is advantageous as it requires no modifications to currently existing networks.

In the cell A1, in the system information block (SIB) to be broadcast on the broadcast channel of the cell A1, a relatively short value (e.g. 30 s, 1 min) is set for the periodic location area update (instead of a nominal value, e.g. 30 min, 1 hour, infinite). This is illustrated in step 7-I. A paging message may be issued in the cell A1 indicating modified system information.

An idle user device T camping on the cell A1 reads the modified SIB and starts providing frequent (e.g. every 30 s, 1 min) periodic LA updates. An LA Update message also includes information about the identity of the user device T.

The telecommunications infrastructure (more particularly a processing system thereof) receives the LA Update messages and may derive (e.g. every 30 s, 1 min) how many and which user devices T are currently camping on the cell A1. This provides information about the initial situation regarding idle user devices in the cell. When this information is not required, this analysis and the preceding steps may be omitted.

In step 7-II, in the cell A1, in the system information to be broadcast on the broadcast channel of the cell, the parameters determining the search behaviour of idle user devices T and/or parameters affecting the ranking of the cell A1 are modified. Most modern wireless access networks such as GSM, UMTS, LTE, provide various parameters to affect the process of cell evaluation for cell selection and reselection performed by idle terminals. The (preferably idle-mode specific) parameter(s) affecting the ranking of cell A1 is set to a value such that cell A1 is, as much as possible, ranked away from the top of the list indicating the 'best cell'. In this manner, it is unlikely that idle terminal T, currently camping on cell A1, will still rank cell A1 as best cell in a next cell reselection procedure. Also, if the previous (optional) steps 7-I were omitted, a relatively short value (e.g. 30 s, 1 min) is set for the periodic location area update (instead of a nominal value, e.g. 30 min, 1 hour, infinite). In the cell, a paging message may be issued indicating modified system information. It should be appreciated that for some RATs (e.g. UMTS) an idle user device T will execute the cell reselection evaluation process when triggered by a modification of the information on the BCCH used for the cell reselection evaluation procedure (i.e. when this particular SIB is modified).

As a consequence, an idle user device T for which the search criterion applies, measures its neighbour cells. For some RATs (e.g. UMTS) a user device will perform such measurements regardless the setting of the search criterion.

An idle user device T for which the specified conditions are satisfied performs cell reselection. The condition for cell reselection may be based on ranking the cell A1 and all neighbour cells. By adjusting the parameter(s) affecting the ranking of cell A1, it is envisaged that cell A1 is not (no longer) the highest-ranked cell and that the idle user device T will make a cell reselection to the highest-ranked cell which is different from cell A1.

An idle user device T persisting to camping on the cell A1 continues providing frequent LA Updates messages to the cell A1. An idle user device T which has reselected a neighbour cell will adhere to the LA Update regime as broadcast by that cell (which may be a nominal value, e.g. 30 min, 1 hour, etc.). Optionally, for example concurrent with step 7-I, neighbour cells of cell A1 are also configured for frequent LA Updates as indicated above and in FIG. 7. In that case, an idle terminal Ti which has reselected a neighbour cell B1 will provide its frequent LA Update messages to the relevant cell B1 resulting in more prompt information to the network about the reselection of terminals towards that neighbour cell.

After a transitional period (whose length may depend on the duration of the cell reselection procedure and the LA Update period), the processing system of the telecommunications infrastructure may at least derive in step 7-III, from the received LA Update messages still being received from cell A1, how many and which idle user devices remain camped on the cell A1, indicating that these user devices were unable to reselect an alternative cell. By, in addition, using the option of step 7-I and/or the option of frequent LA Updates for cell A1's neighbour cells, the processing system may also derive, from the LA Update messages received previously via cell A1 and from the LA Update messages received currently via any of its neighbour cells, how many and which idle user devices have reselected a neighbour cell (and which cell) and how many and, possibly, which idle user devices have reselected from the cell A1 to other cells. This information is indicative of the situation regarding idle user devices T when cell A1 would be deactivated. Also if the options outlined above (the option of step 7-I to obtain information about the initial situation in cell A1 and the option to obtain information about to which cells the idle terminals reselected) are not used, the analysis provides at least an estimate about the number (and identity) of idle user devices T to be adversely affected when cell A1 would be deactivated.

The information obtained in step 7-III may be taken into account in the evaluation by the processing system about whether or not deactivate cell A1. The processing result can be analyzed against the at least one deactivation condition After sufficient information has been obtained in step 7-III, the system information in the neighbour cells may be reverted to normal operating conditions, as far as applicable (step 7-IV), including reverting the LA update periods to nominal values. A paging message may be issued indicating modified system information. When cell A1 is decided not to be deactivated, the system information in the cell A1 may be reverted to normal operating conditions (step 7-IV). A paging message may be issued indicating modified system information.

In the above methods, when it is decided to deactivate a given active cell, the idle user devices T camping on this cell are preferably informed beforehand, as to allow them to perform a cell reselection and camp on another active cell. Several solutions exist for this. The more elegant solution is (assuming that active user devices are handed over to suitable neighbour cell(s), e.g. using existing and conventional methods) to indicate the cell as not being suitable to camp on. Most modern radio access technologies have facilities, for example, to set access class limitations, to indicate that the cell is not intended for user traffic, etc. For example, set the 'cell barred' indicator in the system information of cell A1. Depending on the applicable access technology, a paging message may be issued in the cell A1 indicating modified system information. Once the idle user devices T have detected that the cell they currently camp on is barred, they will perform a cell reselection. Another, less elegant, way is to simply switch off the cell and let the idle user devices discover (typically within no more than a few seconds) that the cell is no longer active, upon which they will perform a cell reselection.

Figure 8:
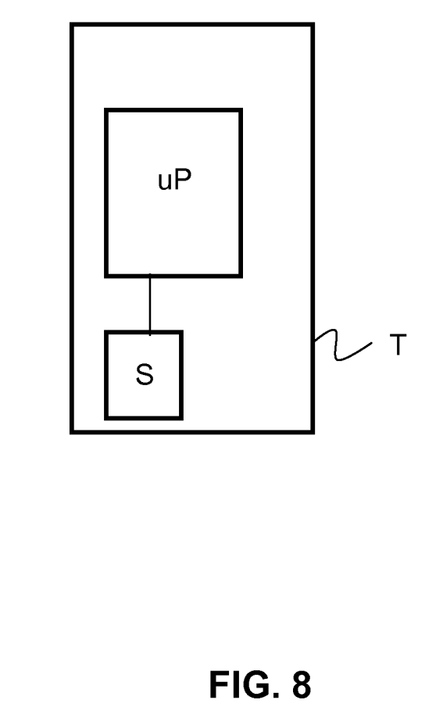
FIG. 8 is a schematic illustration of a wireless user device configured for being operable in the system of FIGS. 2A and 2B.

Whereas the disclosed method and telecommunications network may use existing measurement and reporting capabilities of wireless user devices, the capabilities of wireless user devices should be adapted to participate in these embodiments. Examples have been indicated above and include the recognition, processing and actions performed for cell reselection, in response to the reporting identifier (reporting flag) and/or the measurement-and-reporting paging message of the above-described methods. Most of these enhanced capabilities will be obtained by software modifications in the wireless user devices. Therefore, FIG. 8 is a highly schematic illustration of a wireless user device T comprising storage S and processor uP configured for storing and operating the modified software.

It should be noted that neighbour measurements (pilot signal strength/quality, path loss estimate) and reporting for active user device 1 that is not preparing for handover and for all idle user devices puts an extra burden on the user devices and increases its battery usage. Therefore, this triggering by the network preferably is performed during a limited time interval, e.g. during a few minutes before a decision to switch off base station A in order to verify that the user devices in the cell(s) of base station A are eligible for being served by intra- or inter-RAT neighbour cells. Once sufficient measurements have been made, the nominal threshold setting should be used and there is no longer a measurement and reporting overhead for the active and idle user devices. This applies in particular to the third method for the idle user devices, whereas the overhead induced by the first or second method is predominantly eventrelated.

As indicated in FIG. 4, a QoS verification may be part of the step of analysing the measurement information received from the active user devices. In particular, it may be verified whether an appropriate (e.g. a minimum) QoS can still be obtained for one or more user devices once a cell is deactivated and the user devices are handed over to the most suitable second cell. Generally, it should be appreciated that QoS verification may be direction dependent, i.e. the QoS requirements may be different for uplink (UL) en downlink (DL) and QoS verification is preferably performed separately for each direction.

Figure 9:
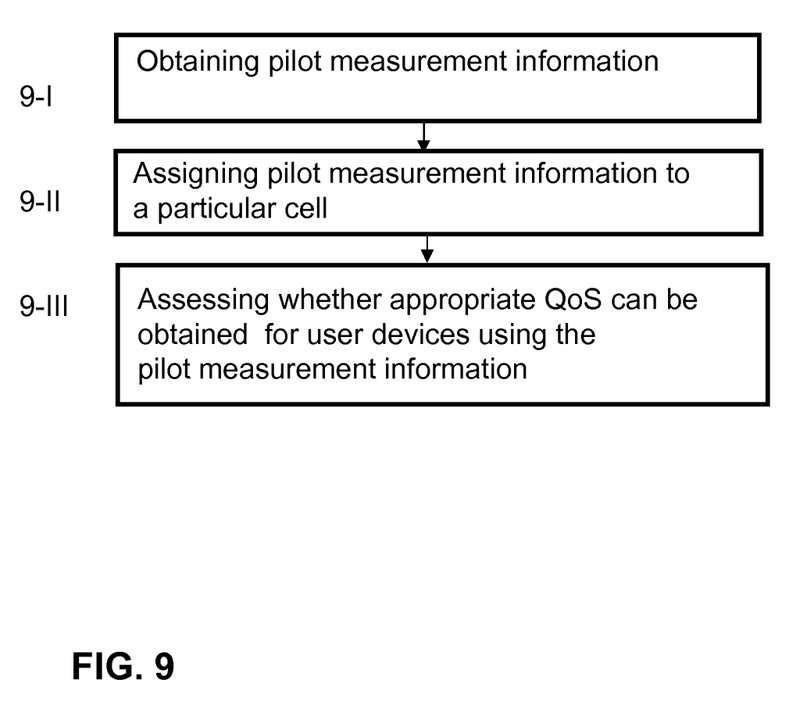
FIG. 9 is a flow chart for QoS verification for user devices to determine eligibility for transfer to another cell.

FIG. 9 shows a general flow chart for QoS verification in a telecommunications network for a plurality of active user devices in a cell that is a candidate to be deactivated. A cell may be considered a candidate to be deactivated since the coverage check (see FIG. 4) for user devices in this cell was successful, i.e. most user devices proved capable of being covered by neighbouring second cells.

In step 9-I, active user devices are triggered to report measurement information, particularly the strength or quality of a pilot or reference signal (pilot measurement information), to the telecommunications network. Of course, the pilot or reference signal used can be same signal used for the coverage check as explained above with reference to FIGS. 3 and 4.

In a next step, step 9-II, the measurement information is analysed in order to obtain knowledge of the preferred (best) candidate cell for substantially each user device in the cell that is considered for deactivation. The pilot measurement information is assigned to this candidate cell. This step also results in information on the number of user devices that will potentially be served by each of the candidate second cells in addition to the known number of user devices that are already served by these cells.

It should be noted that the selection of the user devices regarding the best potentially serving cell may e.g. be performed in the base station of the first cell or in another processing device within or external to the telecommunications network. The measurement results for the selected user devices may e.g. be forwarded to the base station responsible for a candidate second cell. Alternatively, the measurement results for all user devices may be transferred to all base stations responsible for the second cells, such that these base stations determine which user devices can potentially be served by which one of their cells.

Then, in a final step 9-III, it is assessed whether an appropriate QoS can be achieved for the potentially additional user devices to be served by the cell, using the measurement information (to derive e.g. the resource requirements) and the total number of user devices in the cell, assuming that the potentially additional user devices are indeed served by the cell.

Below, the general approach for QoS verification will be described in further detail for two specific scenarios. It should be appreciated that the general QoS verification approach is applicable to other scenarios as well. Again, the first cell is assumed to be the candidate cell for deactivation and the one or more second cells are cells to which the active user devices may be handed over.

The first scenario involves a QoS verification for a HSDPA or LTE network in the downlink (DL) direction. For HSDPA networks, the pilot signal for the one or more second cells is given by the Common Pilot Channel (CPICH); for LTE, the reference signal (RS) is used.

For step 9-I, active user devices are triggered to report the pilot quality as measured for the one or more of the second cells to the first cell. For HSDPA, the pilot quality can be expressed as the energy per chip over interference plus noise density (Ec/N0), whereas for LTE, the pilot quality can be expressed as the reference signal received quality (RSRQ).

For step 9-II, the active user devices are selected as eligible for being served by a particular second cell on the basis of the reported pilot quality. As an example, active user device 1 in FIG. 2A is selected as a user device that is eligible for being served by a particular cell of base station B. For each potentially serving cell, the number N1 of potentially additional user devices 1 is thus known.

Then, for step 9-III it is assessed whether in the one or more second cells an appropriate QoS can be achieved for the potentially additional user devices to be served by the cell, whereas QoS requirements can also be satisfied for the currently served user devices once the additional user devices would indeed be handed over.

HSDPA and LTE networks have shared transport channels. In systems with shared transport channels, the experienced average throughput of a given user device can be estimated by the average bit rate as experienced during time frames when the user device is actually scheduled for transmission, multiplied by the fraction of time the user device is indeed scheduled. Assuming some form of fair resource sharing, as typically applied, this time fraction is equal to 1/N, with N the number of active user devices.

The following information elements are available for a best second cell. It is assumed that the second cell already serves N2 user devices. Then, an experienced bit rate for these user devices when scheduled for transmission on the shared transport channel is known.

Furthermore, a mapping or table is assumed to be available relating a particular pilot quality to an achievable bit rate when scheduled for transmission. Such a mapping or table can be updated and adjusted based on based on live network measurements.

Moreover, for each user device session, the (minimum) downlink QoS requirement is known, either from the session-specific QoS profile (e.g. based on HLR (Home Location Register) information) or as an operator policy or target parameter conveyed e.g. via the OMC (Operations and Maintenance Center). The downlink QoS requirement may also be known from the PDP context. The QoS requiremement may be zero, i.e. a minimum QoS requirement does not exist. The QoS requirement may be a minimum or threshold throughput $R_{TH}$, e.g. expressed in bit per second (bit/s), for a user device for a particular service.

From these information elements, QoS verification can be performed for both the N1 potentially additional user devices intended to be handed over to the second cell and for the N2 user devices already served by the second cell.

For the potentially additional user devices of the second cell, the downlink throughput for the potentially newly added user devices is estimated by dividing the estimated bit rate when scheduled for transmission, by the updated number N1+N2 of served user devices in the considered second cell. Herein, the estimated bit rate when scheduled for transmission is based on the reported pilot quality in combination with the aforementioned mapping or table. The QoS verification entails a comparison of these throughput estimates with the QoS requirements, such as the minimum required throughput $R_{TH}$.

For the already serviced user devices, the estimated (reduced) downlink throughput experienced by the currently served user devices in the second cell can be determined by dividing their experienced bit rates when scheduled for transmission, by the updated number of served user devices N1+N2. The QoS check entails a comparison of these throughput estimates with the QoS requirements, such as the minimum required throughput $R_{TH}$.

It should be appreciated that the QoS verification may need to be performed several times, considering different subsets of potentially handed over (candidate) user devices. This may be needed if a QoS verification points out that not all candidate user devices can be served with adequate QoS by the considered second cell. In such case, (at least) one such user device may be rejected and, since fewer user devices are then estimated to share the second cell's resources, the QoS check for the remaining user device may need to be performed again.

Eventually, the above method results in one or more subsets of candidate user devices that can indeed be accommodated by second cells. Combining this information for all second cells then provides sufficient QoS-related input for deciding whether or not the first cell considered for deactivation may indeed be deactivated.

It is noted that in the above method, the pilot quality measurements reported by the candidate user devices may underestimate the pilot quality actually experienced after deactivating the first cell, since the measurements on the second cells are are performed while the first cell is still active and the measurements, hence, include some interference experienced from that first cell. If the first (currently serving) cell is indeed deactivated (as targeted), this interference no longer exists and the true pilot quality (for each candidate second cell) will be somewhat higher. Effectively, the above method thus provides a somewhat pessimistic result on the attainable QoS. This implicitly establishes a margin for estimation inaccuracies. Experience should point out whether this margin is adequate or perhaps too conservative or speculative, in which case a more explicit (positive or negative) margin may need to be applied.

A second scenario relates to QoS verification in an LTE network in the uplink (UL) direction.

For step 9-I, active user devices are triggered to report the reference signal received power (RSRP) as measured for one or more for the one or more of the second cells to the first cell. It is noted that the RSRP may also be used for performing the coverage check.

For step 9-II, the active user devices are selected as eligible for being served by a particular second cell. The first cell may then forward the measurements to the respective second cells towards which the active user devices may be handed over. Knowing the reference signal transmit powers for the second cells and assuming channel reciprocity (i.e. it is assumed that the path loss in the UL and the DL direction is identical), the RSRP measurements and reference signal transmit power are used to estimate the uplink path loss from the given user device to the considered second cell. In other words, from the RS transmit power at the base station and the RSRP measurement by the user device, the downlink path loss is estimated. The same value is used as an estimate for the uplink path loss.

Then, for step 9-III it is assessed whether in the one or more second cells an appropriate QoS can be achieved for the potentially additional user devices to be served by the cell, whereas QoS requirements can also be satisfied for the currently served user devices once the additional user devices would indeed be handed over.

The assessment can be based on the following information elements.

First, the number of currently available physical resource blocks (PRBs) is assessed, as well as the interference level that is experienced in each PRB and the current value of the target received power density $P_0$ per PRB.

A further information element is a mapping of an estimated signal-to-interference ratio (SINR) to an appropriate modulation and coding scheme (MCS), and hence the corresponding data rate, is known from e.g. live network experience, laboratory experiments or simulations.

Moreover, for each user device session, the (minimum) uplink QoS requirement is known, either from the session-specific QoS profile (e.g. based on HLR (Home Location Register) information) or as an operator policy or target parameter conveyed e.g. via the OMC (Operations and Maintenance Center). The uplink QoS requirement may also be known from the PDP context. The QoS requirement may be zero, i.e. a minimum QoS requirement does not exist. The QoS requirement may be translated to a required number of PRBs.

For the user devices currently active in the considered second cell, the number of PRBs can be determined based on the currently experienced throughput, the current number of assigned PRBs, the experienced SINR levels per assigned PRB and the throughput (QoS) requirement. With this information, the minimum set of required PRBs to satisfy the QoS requirement of the user device can be determined. Having derived the required number (or set) of PRBs per active user device, it is immediately known how many and which uplink PRBs are available for assignment to potentially additional user devices from the first cell which is considered to be deactivated.

Then for each such potentially additional user device, the number/set of required PRBs is estimated that is needed to satisfy its QoS requirement. This can be done by considering different (increasing) sets of assigned PRBs, estimate the effective aggregate SINR level (based on $P_0$, the measured interference levels per PRB, and e.g. an exponential effective SINR mapping (EESM) method for aggregation of the estimated PRBspecific SINRs), choose the correspondingly estimated most suitable MCS from an SINR-to-MCS mapping (which can be determined or updated based on network experience), and determine the corresponding aggregate bit rate (which follows directly from the MCS). With this approach, the minimal set of PRBs needed to achieve an aggregate bit rate that exceeds the different user device specific uplink QoS requirements can be derived for each user device.

Per user device, it is then verified whether the target received power level $P_0$ per PRB can actually be achieved, given the maximum transmit power of the user device and the estimated path loss (calculated by subtracting the RSRP from the transmit power of the Reference Signal) towards the considered second cell (coverage check). In other words, it is checked whether the transmit power of the user device is sufficient to achieve the targeted $P_0$ level for all (potentially) assigned PRBs to satisfy the QoS requirement. Basically, the required transmit power, i.e. $P_0$ * the required number of PRBs * estimated path loss (all in linear units), should not exceed the maximum transmit power $P_{max}$ of the user device.

Knowing the required number of PRBs for all candidate user device, and having performed the coverage check, it may be verified whether all or only a subset of candidate user devices can be handed over to the considered second cell, given the available set of PRBs. Eventually, the method may result in one or more subsets of candidate user devices that can indeed be adopted by each neighbour cell. Combining this information for all second cells then provides sufficient QoS-related input for deciding whether or not the first cell considered for deactivation may indeed be deactivated.

Figure 10:
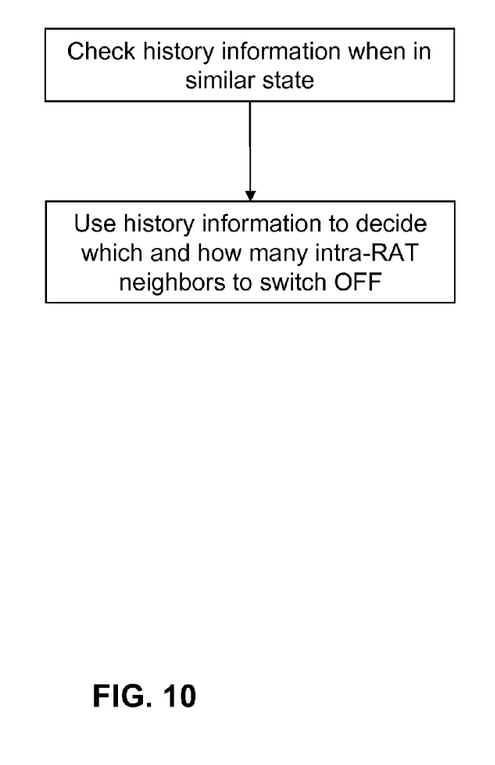
FIG. 10 is a flow chart for deciding deactivation of a cell of the telecommunications network according to an embodiment of the invention.

FIG. 10 shows an alternative method for deciding whether or not a particular cell A can be deactivated using history information. History information is retrieved about a previous transition from a first previous state wherein the first cell was an active cell and the second cell was an active cell to a second previous state wherein the first cell was an inactive cell and the second cell was an active cell. As an example, if it is considered to deactivate the first cell at a particular time of day/week, information is retrieved about the effect of switching off the first cell in the past at that particular moment. The information could e.g. relate to the number of handovers from the first active cell to the second cell. It may then be estimated from the retrieved history information whether the first cell may be deactivated. The first cell is activated based on the estimation that user devices may be transferred to the active second cell.

Figure 1B:
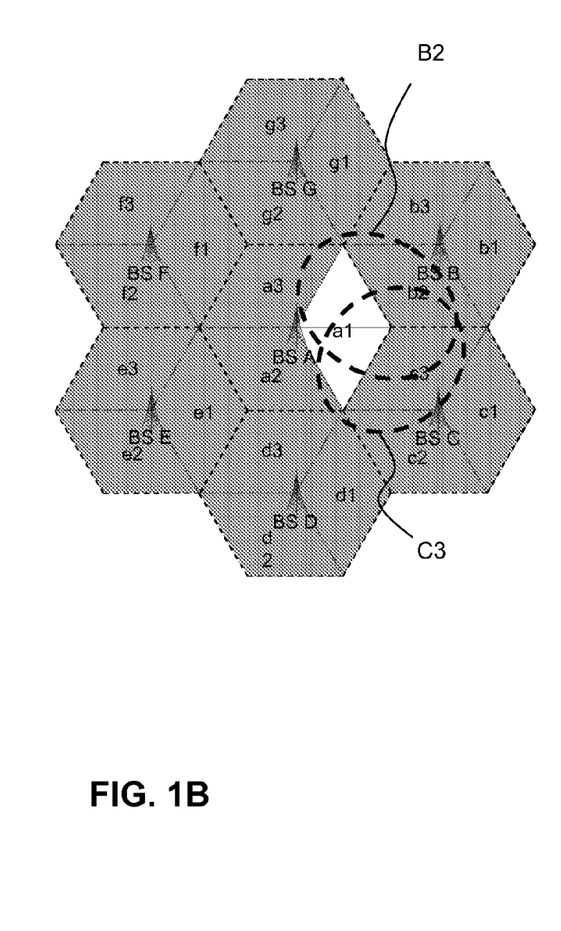

Consider now the situation of FIG. 1B, wherein base stations BS B to BS G are active base stations and BS A is an inactive base station for at least one RAT. Increased network load for base stations BS B and/or BS C may ultimately result in congestion in the cells B2, C3 of these base stations, such that activation of cell A1 for the specified RAT is desirable. Since base station BS A is inactive for a particular RAT, a problem arises as to how much traffic can be shifted to cell A1.

Figure 11:
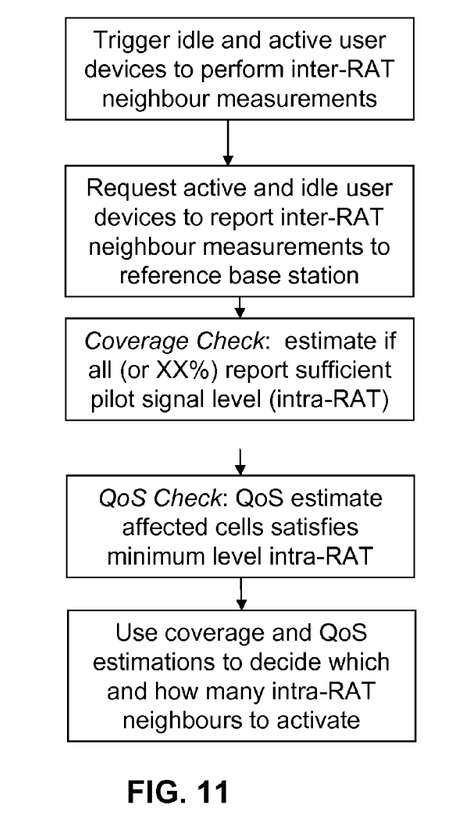
FIG. 11 is a flow chart for deciding activation of a cell of the telecommunications network according to another embodiment of the invention.

The method depicted in the flow chart of FIG. 11 involves using inter-RAT measurements from preferably co-sited cells (also labelled with A1, B2, C3 etc. in FIG. 1) and making translation/conclusions about the supported intra-RAT load in these cells.

In particular, FIG. 11 relates to a method in a telecommunications network containing a plurality of cells defining a coverage area containing a plurality of user devices. The plurality of cells comprise a first cell B2, C3 as an active cell for a first radio access technology (RAT) and a second cell A1 as an inactive cell for the first radio access technology and an active cell for a second radio access technology. Examples of radio access technologies, also abbreviated as RATs, include GSM, UMTS and LTE.

User devices in the at least one first cell B2, C3 are triggered to report measurement information regarding the second radio access technology of the second cell A1. The measurement information regarding the second radio access technology of the second cell A1 is received in the telecommunications network (e.g. via the first cell B2 or C3 using the first RAT or via the second cell A1 using the second RAT) to determine whether one or more user devices in the at least one first cell B2, C3 are eligible for being served by the second cell A1 using the first radio access technology.

The first radio access technology is activated in the second cell when the one or more user devices are determined to be eligible for being served by the second cell using the first radio access technology.

In order to improve the accuracy of estimations for the first RAT in the second cell based on measurement information for the second RAT in the second cell, the second cell for the first RAT and second RAT are co-sited.

As illustrated in FIG. 11, the decision to switch on inactive cells may again include a QoS verification. Whereas generally, a QoS verification would appear to be unnecessary in case of activation of a new cell in a network (for coverage, capacity and performance are expected to improve), QoS verification may still prove useful to decide which cell to activate in case of multiple alternatives for activating cells.

Again, two exemplary scenarios will be considered. The first scenario assumes two networks of different RATs, A and B with at least one co-sited base station. The second scenario involves a case wherein the base station locations are different.

Figure 12:
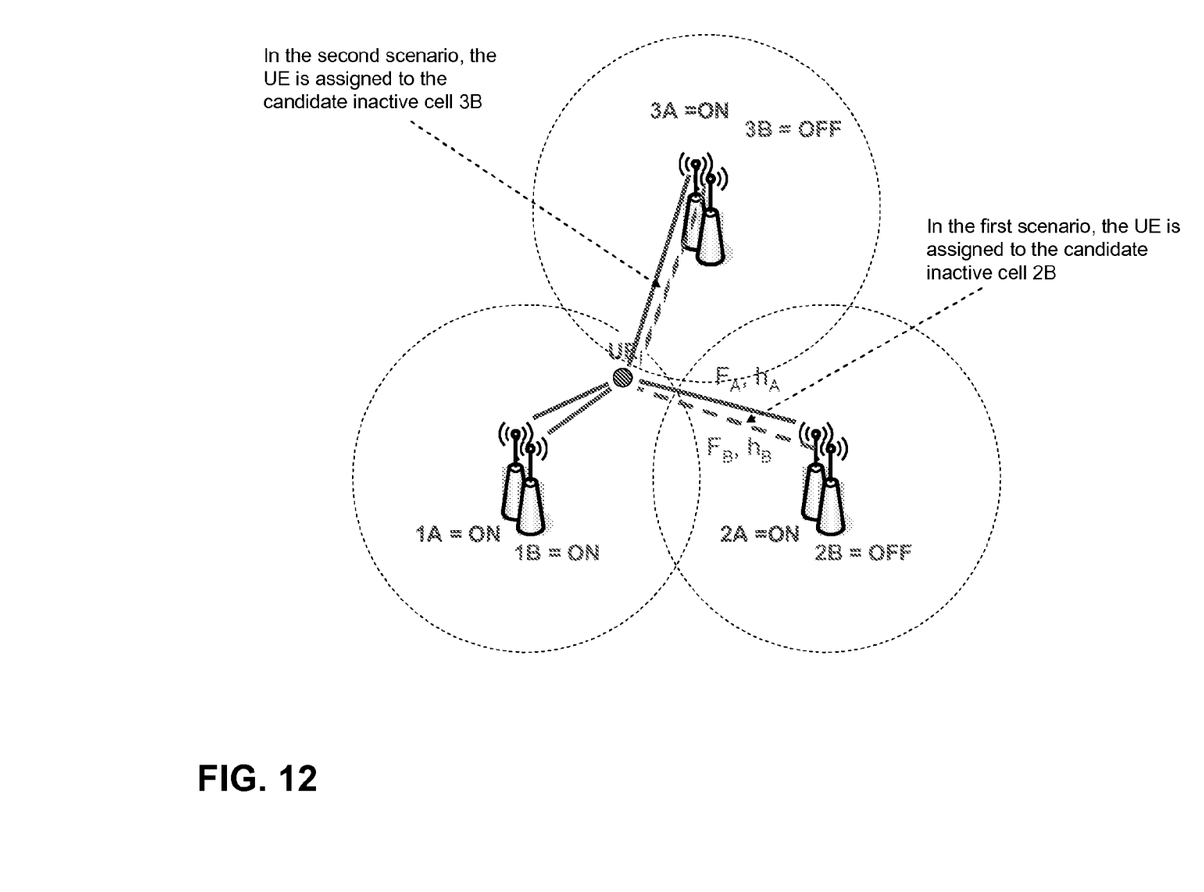
FIG. 12 is a schematic illustration of a multi-RAT network wherein a cell is activated.

FIG. 12 depicts a scenario with co-sited networks of RAT A and B. On the first site both cells, denoted 1A and 1B, are active, while on the second site only the cell 2A corresponding to RAT A is active. The reactivation procedure considers reactivation of cell 2B for RAT B in order to relieve the overload experienced in the cells 1A and 1B.

Assuming that a QoS verification is part of the reactivation decision procedure as depicted in FIG. 11, for a number of users currently served by overloaded cells 1A and 1B, it may be estimated (i) what QoS the user devices would experience if handed over to a reactivated cell 2B; and (ii) what QoS those user devices remaining in cells 1A or 1B would experience.

Considering e.g. LTE or HSPA technologies, for QoS verification (ii) the QoS can e.g. be estimated by a straightforward recalculation of the sharing factor 1/N, i.e. the time share that each user device is served on the shared channel.

QoS verification (i) may require the estimation of the achievable QoS at potentially reactivated cell 2B, for which no pilot strength information may be available since this cell is inactive. A possible way to estimate this pilot strength is for the candidate users, currently served in cells 1A or 1B, to measure the pilot strength (e.g. RSCP (CPICH in UMTS/HSPA) or RSRP (RS in LTE)) from active cell 2A, which is co-located with inactive cell 2B. The antenna height $h_A$, transmit power $P_A$ and carrier frequency $F_A$ applied for cell 2A's pilot signal, as well as the antenna height $h_B$, transmit power $P_A$ and carrier frequency $F_B$ that will be applied for cell 2B's pilot once reactivated is known from the configuration set-up. Consequently, the pilot strength $P_{R,A}$ measured for cell 2A can be mapped to a pilot strength $P_{R,B}$ for cell 2B by using a suitable radio propagation model (e.g. the COST Hata model) as follows:

First, the path loss between the user device and cell 2A is calculated from the measured $P_{R,A}$ as $PL_A = P_A - P_{R,A}$, where $P_{R,A}$ denotes the received pilot power level and $P_A$ denotes the transmitted pilot power level.

Second, the pilot strength $P_{R,B}$ is estimated by applying propagation related corrections on $PL_A$: $P_{R,B} = P_B - (PL_A + a(F_A, F_B) + b(h_A, h_B))$ Here, $a(F_A, F_B)$ is the frequency correction factor and $b(h_A, h_B)$ is the antenna height correction factor derived from the corresponding propagation model. It should be noted that for typical co-located deployments of cell A and B (e.g. height difference up to 2 m) the distance from the user device to cell A and B is assumed the same. Additionally, this may result in a negligible correction factor $b(h_A, h_B)$.

In the second scenario for non co-sited cells A and B the corrections on $PL_A$, as presented above, may not be applicable to calculate the pilot received signal strength $P_{R,B}$. In this case, position information for user devices can be used to obtain the path loss $PL_B$ between the user device and the site of cell 2B by using a detailed propagation prediction database (e.g. predicting the pilot signal strength per location). Consequently, the pilot strength $P_{R,B}$ is calculated as $P_R = P_B - PL_B$. For user devices equipped with a GPS receiver, the position information of the user device can be obtained using the GPS system. For user devices without a GPS receiver, the position information could still be obtained using e.g. the downlink signals from multiple base stations, for instance as specified in 3GPP TS 36.305 for LTE and TS 25.305 for UMTS/HSPA.

Combined with a measurement of the current interference level on the corresponding carrier, an SINR estimate can be made, which is in turn readily mapped to an estimated bit rate the candidate user device would experience in cell 2B, assuming exclusive access to the cell's shared transport channel. It is noted that the interference level might be different before and after the reactivation of the concerned cell, since there is at least one more cell active after the reactivation procedure.

The decision procedure for cell reactivation typically evaluates different scenarios in terms of the set of user devices that is handed over from cells 1A and 1B to cell 2B and/or other neighbour candidate cells (once reactivated), where each such scenario leads to a number of user devices served in each candidate cell and hence a corresponding cell-specific sharing factor 1/N. As depicted in FIG. 12, in different scenarios the same user device might be assigned to different candidate cells 2B or 3B. Multiplying the estimated bit rate for each user device by the sharing factor yields the estimated throughputs. As before, the QoS verification entails a comparison of these throughput estimates with the QoS requirements. The scenario which meets the QoS requirements by reactivating the fewest inactive cells may be selected. If two scenarios by chance need to reactivate the same amount of inactive cells, the one which provides e.g. better QoS or consumes less energy may be selected.

The invention claimed is:

1. A method for deactivation of at least one first cell of a plurality of cells in a telecommunications network, the plurality of cells defining a coverage area containing a plurality of user devices, the method comprising:
   triggering at least one user device of the plurality of user devices in the at least one first cell to report measurement information regarding one or more second cells of the plurality of cells to the telecommunications network;
   receiving and analyzing the measurement information regarding the one or more second cells to determine whether the at least one user device of the plurality of user devices in the at least one first cell is eligible for being served by a second cell of the one or more second cells when the at least one first cell would be deactivated; and
   deactivating the at least one first cell when the at least one user device is determined to be eligible for being served by the second cell of the one or more second cells, wherein analyzing the measurement information regarding the one or more second cells includes verifying whether an estimate of the quality of service obtained in the second cell meets a quality of service condition, and wherein verifying whether an estimate of the quality of service obtained in the second cell meets a quality of service condition comprises:
      obtaining, from the at least one user device of the plurality of user devices in the at least one first cell pilot measurement information comprising at least one of pilot signal strength or pilot quality measurement information related to the one or more second cells;
      assessing the pilot measurement information to assign the pilot measurement information for at least one particular user device of the plurality of user devices to a particular second cell of the one or more second cells; and
      verifying whether the particular second cell is capable of satisfying a required quality of service for the at least one particular user device of the plurality of user devices when the first cell is deactivated.

2. The method according to claim 1, wherein analyzing the measurement information regarding the one or more second cells includes verifying whether at least one of a signal level or a signal quality at the at least one user device from the second cell meets at least one of a signal level condition or a signal quality condition.

3. The method according to claim 1, further comprising verifying whether the particular second cell is capable of satisfying a required quality of service for at least one user device already served via the particular second cell when the first cell is deactivated and the at least one particular user device would be handed over to the particular second cell.

4. The method according to claim 1, wherein triggering at least one user device of the plurality of user devices in the at least one first cell to report measurement information regarding one or more second cells of the plurality of cells to the telecommunications network is based on a cell load experienced in the at least one first cell from active user devices of the plurality of user devices.

5. The method according to claim 1, wherein the at least one first cell and the second cell of the one or more second cells define a handover area in the coverage area, and wherein triggering at least one user device of the plurality of user devices in the at least one first cell to report measurement information regarding one or more second cells of the plurality of cells to the telecommunications network includes a trigger to user devices in the first cell and outside the handover area.

6. The method according to claim 1, further comprising instructing the at least one user device in the at least one first cell using a broadcast channel in the at least one first cell, to set at least one of a measurement threshold to enable the at least one user device to obtain measurement information or a reporting threshold defining a threshold for reporting the measurement information.

7. The method according to claim 1, further comprising:
   requesting the measurement information from at least one active user device via signaling channels; and
   receiving the measurement information from at least one active user device via signaling channels.

8. The method according to claim 7, wherein requesting the measurement information regarding the one or more second cells is performed during a time interval comprising less than 15 minutes.

9. A user device configured for operating in the method according to claim 1.

10. A method for deactivation of at least one first cell of a plurality of cells in a telecommunications network the plurality of cells defining a coverage area containing a plurality of user devices, the method comprising:
triggering at least one user device of the plurality of user devices in the at least one first cell to report measurement information regarding one or more second cells of the plurality of cells to the telecommunications network;
receiving and analyzing the measurement information regarding the one or more second cells to determine whether the at least one user device of the plurality of user devices in the at least one first cell is eligible for being served by a second cell of the one or more second cells when the at least one first cell would be deactivated;
deactivating the at least one first cell when the at least one user device is determined to be eligible for being served by the second cell of the one or more second cells;
performing at least one of an energy consumption reduction analysis or an electromagnetic radiation reduction analysis for the telecommunications network to obtain at least one of an energy consumption reduction analysis result or an electromagnetic radiation analysis result; and
deactivating the at least one first cell when at least one of the energy consumption reduction analysis result meets an energy reduction condition or the electromagnetic radiation analysis result meets an electromagnetic radiation reduction condition.

11. A method for deactivation of at least one first cell of a plurality of cells in a telecommunications network, the plurality of cells defining a coverage area containing a plurality of user devices, the method comprising:
triggering at least one user device of the plurality of user devices in the at least one first cell to report measurement information regarding one or more second cells of the plurality of cells to the telecommunications network;
receiving and analyzing the measurement information regarding the one or more second cells to determine whether the at least one user device of the plurality of user devices in the at least one first cell is eligible for being served by a second cell of the one or more second cells when the at least one first cell would be deactivated; and
deactivating the at least one first cell when the at least one user device is determined to be eligible for being served by the second cell of the one or more second cells;
wherein triggering at least one user device of the plurality of user devices in the at least one first cell comprises at least one of:
transmitting a reporting identifier in the at least one first cell;
manipulating a signal threshold to be applied by the at least one user device in the at least one first cell;
transmitting a paging message in the first cell instructing at least one idle user device of the plurality of devices to obtain or report the measurement information; or
temporarily decreasing a location area update period in the at least one first cell.

12. A computer program comprising software code portions configured for, when executed by a processor, performing functions comprising:
triggering at least one user device of the plurality of user devices in the at least one first cell to report measurement information regarding one or more second cells of the plurality of cells to the telecommunications network;
receiving and analyzing the measurement information regarding the one or more second cells to determine whether the at least one user device of the plurality of user devices in the at least one first cell is eligible for being served by a second cell of the one or more second cells when the at least one first cell would be deactivated;
deactivating the at least one first cell when the one or more user devices are determined to be eligible for being served by the second cell of the one or more second cells;
obtaining, from the at least one user device of the plurality of user devices in the at least one first cell pilot measurement information comprising at least one of pilot signal strength or pilot quality measurement information related to the one or more second cells;
assessing the pilot measurement information to assign the pilot measurement information for at least one particular user device of the plurality of user devices to a particular second cell of the one or more second cells; and
verifying whether the particular second cell is capable of satisfying a required quality of service for the at least one particular user device of the plurality of user devices when the first cell is deactivated.

13. The computer program of claim 12, wherein the functions further comprise verifying whether at least one of a signal level or a signal quality at the at least one user device from the second cell meets at least one of a signal level condition or a signal quality condition.

14. The computer program of claim 12, wherein the functions further comprise verifying whether an estimate of the quality of service obtained in the second cell meets a quality of service condition.

* * * * *